3,471,327
METHOD OF INSULATING THIN ELECTRIC CONDUCTORS, PARTICULARLY EXTREMELY THIN COPPER CONDUCTORS, WITH THERMOPLASTIC SYNTHETIC MATERIALS
Heinz Gerland, Werner Götze, and Walter Jaeschke, Berlin, Germany, assignors to Siemens Aktiengesellschaft, a corporation of Germany
Filed Aug. 28, 1964, Ser. No. 392,775
Claims priority, application Germany, Sept. 25, 1963, S 87,492
Int. Cl. H01b 1/02; B44d 1/34
U.S. Cl. 117—232
6 Claims

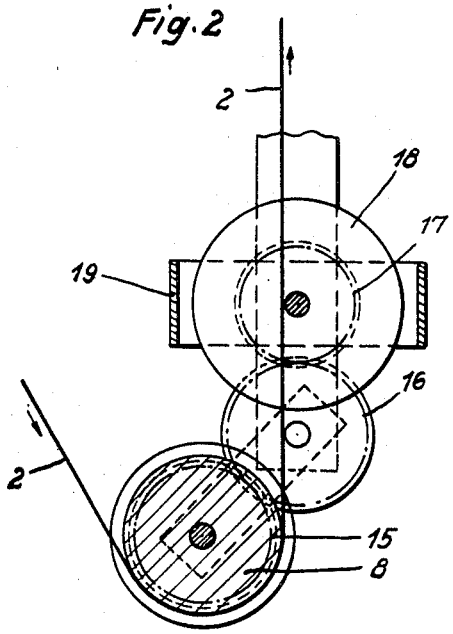
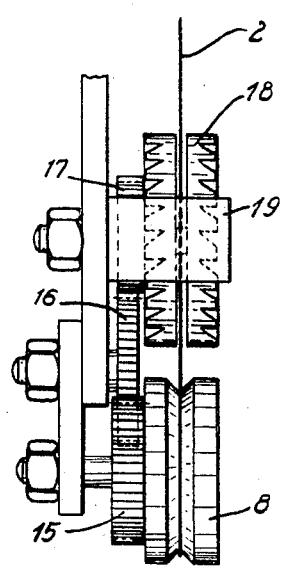
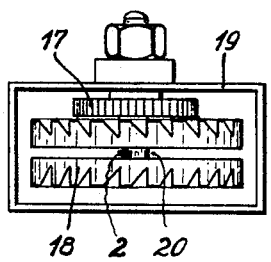
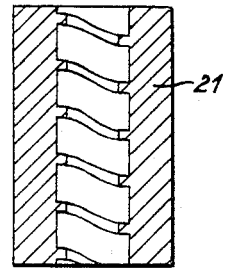

ABSTRACT OF THE DISCLOSURE

Method of insulating thin electrical conductors with a polyolefin coating includes passing the conductor through an aqueous dispersion of thixotropic structure, containing a solid pulverulent content of 25 to 45% of the polyolefin, mechanically reducing the viscosity of the thixotropic dispersion at a locality where the conductor emerges from the dispersion, subsequently passing the dispersion-covered conductor through heated furnace zones and therein evaporating the dispersion medium and sintering the remaining pulverulent polyolefin on the conductor to form a homogeneous coherent coating.

---

Our invention relates to a method of insulating electric conductors, particularly extremely thin copper conductors, with thermoplastic synthetic material.

A conventional method of this type is performed by extruding the thermoplastic synthetic material, for example polyethylene, around the conductor to be insulated. This method leads to difficulties if the diameter of the conductor is below certain minimum values. For example, the conventional extruders are applicable only with great difficulty if the insulating thickness is less than 0.2 mm.

It is known to employ polyethylene solutions for insulating extremely thin copper conductors. For this purpose, polyethylene is dissolved, for example in toluene. This, however, has the disadvantage that high temperatures must be used for dissolving the polyethylene. Thus, in the known method for coating copper conductors of 0.3 mm. diameter with polyethylene, the polyethylene solution must be processed at a minimum temperature of 95° C. Furthermore, the large quantities of solvent, which must be evaporated during drying, are detrimental to the environment.

It is an object of our invention to afford producing an insulation on extremely thin copper wires or other electrical conductors that avoids the above-mentioned difficulties.

According to the invention, the thermoplastic synthetic material, preferably consisting of polyolefines, is brought upon the conductor from a liquid, preferably aqueous dispersion of thixotropic structure, the viscosity of the thixotropic dispersion at a locality where the conductor emerges from the dispersion being mechanically reduced, and the conductor thus covered with the dispersion subsequently passes through heated furnaces in which the dispersion medium escapes, and the pulverulent thermoplastic synthetic material remaining on the conductor is sintered and thus fused together to form a coherent and homogeneous coating.

Essential to the method of the invention, therefore, is the use of a liquid, preferably aqueous dispersion and hence of a dispersed system in which the thermoplastic synthetic material is contained as a solid phase in a liquid phase constituted by the dispersion medium and consisting mainly of water.

In comparison with the known use of hot solutions of synthetic plastics, the method according to the invention affords the advantage that the liquid, preferably aqueous dispersion of thixotropic structure can be processed at room temperature when being applied to the conductor, and that any detrimental or obnoxious effects as may occur by any solvents escaping during the drying process, are avoided.

The method of the invention is especially well suitable for coating extremely thin electric conductors with polyethylene. Applicable for this purpose is high-pressure polyethylene as well as low-pressure polyethylene in fine-pulverulent form. A maximum particle size of about 50μ should not be exceeded. In view of the thermal dissociation occurring in the furnace zones, it is advisable to stabilize the polyethylene powder with about 0.5 to 3% of stabilizers, such as the known polyethylene-stabilizer substances: 4,4'-thio-bis-(3-methyl-6-tert.-butylphenol); N,N'-diphenyl-p-phenylenediamine and mercaptobenzimidazol.

It is preferable to adapt the principle of the dispersion medium to the density of the polyolefin thermoplastic synthetic to be applied to the electric conductor. Such adaptation is effected by adding compounds which are soluble in water and/or are miscible with water. For that reason, the dispersion medium consists preferably to the preponderant extent of water with addition of 10 to 50% lower aliphatic alcohols and/or ketones. Examples of such lower aliphatic alcohols or ketones are: methylalcohol, ethylalcohol, propylalcohol, dimethylketone.

Furthermore, wetting agents, also known as surface active agents or surfactants may be added to the dispersion medium, which agents reduce the surface and boundary tension between the dispersion medium and the thermoplastic synthetic or the electric conductor to be insulated.

Preferably employed as wetting agents are non-ionic wetting agents so that the electrical and dielectrical properties of the coating produced on the conductor are not impaired. We have found it particularly advantageous to use wetting agents having a polyglycol chain of 5 to 15 molecules ethyleneoxide which are etherized with phenols, these phenols being substituted with aliphatic side chains of $C_9$ to $C_{12}$. Instead of being etherized by substituted phenols, the polyglycol chain may also be etherized with saturated and unsaturated fatty alcohols of $C_8$ to $C_{18}$. Further found as suitable wetting agents are the fatty acid polyglycol esters whose fatty acid component is constituted of saturated and unsaturated $C_8$–$C_{18}$ carboxylic acids. The proportion of the wetting agent should be about 0.2 to 5% relative to the weight of the contents of solid in the dispersion.

Ionic wetting agents, for example ammonium compounds, are likewise applicable, which during the sintering and melting process in the furnace are dissociated thermally to non-ionic products. The ammonium salts of the fatty or resin acids are particularly suitable for this purpose.

The method according to the invention is preferably performed with the aid of vertical tubular furnaces through which the electrical conductor issues from the suspension-containing vessel in a straight path, without being deflected from that path prior to entering into the furnaces. By virtue of such a vertical arrangement, a concentric enveloping of the conductor by the insulation is secured.

The method of the invention further permits providing electrical conductors with insulating coatings of polyolefin foam material. For example, by adding known foaming agents, a polyethylene foam can thus be applied to a copper conductor. Suitable as foaming agents for such purposes are, for example, diazoaminobenzol, diphenyleneoxide-4,4'-disulfohydrazide and benzolsulfohydrazide. These foaming agents are added in a quantity of about 0.5 to 3% by weight. The degree of foaming in the insulating coating thus produced depends upon the type and quantity of the foaming agents, the temperature conditions in the furnace, and also upon the travelling speed of the conductor through the furnace.

A method of the invention also affords applying insulating coatings of colored polyolefins on electrical conductors. The dyes or other coloring agents added to the dispersion medium should be so chosen that they do not appreciably impair the electrical properties of the base material and will withstand the temperature stresses.

In the method according to the invention, a thixotropic dispersion is employed, and the viscosity of the dispersion at the locality where the conductor emerges out of the dispersion is lowered by the action of mechanical means. As a result, the conductor entrains a liquid covering of the desired wall thickness which immediately thereafter solidifies to a gel-like mass which no longer drips off.

In order to obtain the desired thixotropy of the dispersion, it is preferable to add approximately 1 to 20% of higher aliphatic branched or unbranched alcohols such as isopropyl alcohol, amyl alcohol or isobutanol, as well as known thickening agents such as cellulose hydrate, methylcellulose or soya lecithin.

As mentioned, the method is particularly well suitable for coating electric conductors with polyethylene. It is advisable for this purpose to employ a liquid in preferably aqueous dispersion having a solid content of 25 to 45% polyethylene. By employing the above-described method of continuously passing the conductor through a dispersion bath and thence through the heated zones in furnaces, such a polyethylene dispersion affords coating copper wires of 0.15 to 0.8 mm. diameter with a polyethylene coating of 60 to 250$\mu$. The thickness of this polyethylene coating depends upon the composition of the dispersion and the travelling speed of the wire.

The invention will be further described with reference to suitable processing equipment schematically illustrated by way of example on the accompanying drawings in which:

FIG. 2 shows partly in section an assembly of coating rollers applicable in equipment according to FIG. 1.

FIG. 3 is a lateral elevation of the roller assembly shown in FIG. 2.

FIG. 4 is a top view of the same roller assembly.

FIG. 5 shows in cross section a nozzle for reducing the viscosity of the thixotropic dispersion at the emerging locality of the conductor, such a nozzle being also applicable in equipment otherwise corresponding to FIG. 1.

Figure 1:
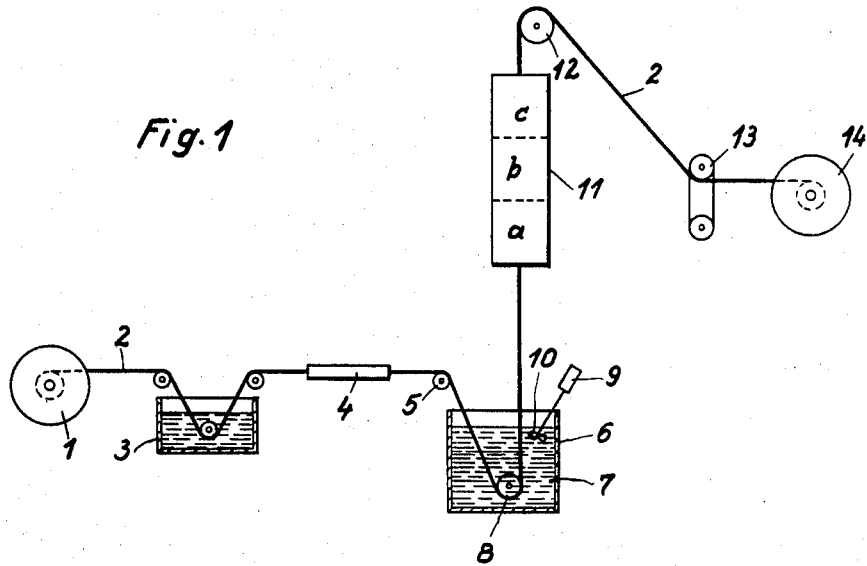
FIG. 1 shows equipment for coating an electrical conductor wire by employing a thixotropic dispersion.

The processing equipment according to FIG. 1 comprises a vertical arrangement of tubular furnaces traversed by a copper wire, after it has passed through a thixotropic dispersion. A copper wire 2, having a diameter of 0.3 mm., is supplied from a reel 1 and travels first through a cleaning bath 3 and subsequently through an annealing device 4 with an internal temperature of 500° C. and a reducing or inert atmosphere. The annealing device 4 serves to soften the copper material of the wire. The wire, thus cleaned and softened, then passes over a guiding roller 5 into a vessel 6 containing a thixotropic polyethylene dispersion 7. The polyethylene dispersion 7 is composed of:

| | Percent |
|---|---|
| Polyethylene powder (stabilized) having a median grain size of 20$\mu$ | 40 |
| Water | 36.5 |
| Methyl alcohol | 15 |
| Nonylphenolpolyglycol ether | 1 |
| Hydrate cellulose | 2.5 |
| Isopropyl alcohol | 5 |

With the aid of a roller 8, the wire 2 is guided to travel vertically upward. In the vicinity where the wire 2 emerges out of the dispersion 7, there is located a stirrer 10 driven from an electric motor 9. The stirring action has the effect of reducing the viscosity of the dispersion 7 at the emerging location of the wire 2.

Subsequently the wire 2, without being deflected from its vertical straight path, passes through the vertical arrangement 11 of furnaces which comprises three heating zones a, b, c of respectively different temperatures. The dispersion medium evaporates in the first heating zone a so that the wire 2 when entering into the heating zone b possesses a uniform and centered covering of dry polyethylene powder. This powder sinters together in the heating zone b and fuses in the heating zone c so as to form a coherent and smooth coating of polyethylene.

The wire 2, when issuing from the vertical furnace 11, is deflected downwardly by a guide roller 12 and is pulled off by a pulling device 13 to be wound upon a take-up drum 14.

For a pulling speed of 10 m./min., there is required a length of about 6 m. for the furnace 11 with the following temperature distribution:

| | ° C. |
|---|---|
| Zone a | 210 |
| Zone b | 240 |
| Zone c | 260 |

Preferably several wires are simultaneously run through one and the same furnace. In order to keep the number of wires as large as feasible, it is advisable to provide the vertical furnace 11 with a longitudinal heating chamber having a cross section of annular shape, and to uniformly distribute the wires circumferentially over the annular heating space of the furnace.

While the wires to be insulated travel vertically through the furnace 11, an appreciable draft of air is caused to pass through the furnace. In order to prevent oxidation of the polyethylene by the oxygen thus supplied in the air draft, the furnace is preferably rinsed with inert gas, in a counterflow to the travel direction of the wire. For example, nitrogen may be passed from above through the furnace along the wire.

In lieu of providing the stirrer 10 shown in FIG. 1 for reducing the viscosity of the thixotropic dispersion near the locality where the wire to be insulated emerges from the dispersion, other mechanical means may be employed for the same purpose. Thus, a vibrator or oscillator may be employed and will be actuated electromagnetically or mechanically, e.g. by compressed air. Another way of mechanically acting upon this locality of the dispersion is to insert ultrasonic oscillator heads.

The viscosity of the thixotropic dispersion near the emergence of the conductor may also be effected by employing a coating roller provided with an air-entraining groove through which the conductor passes. Such a roller is preferably given a design similar to a milling cutter and is at least partially surrounded by a chute or cage so that the shearing forces occurring between the roller and the chute reduce the viscosity of the thixotropic dispersion at the locality where the conductor issues from the dispersion.

A particularly suitable method of covering the conductor by substance taken from a thixotropic dispersion is to drive a coating roller having a groove as mentioned above, with the aid of a meshing engagement from a guiding roller which is submerged in the dispersion-containing vessel and serves for changing the travel direction of the wire. An example of such a coating roller is shown in FIGS. 2, 3 and 4. The guide roller 8, corresponding to the guide roller 8 in vessel 6 according to FIG. 1, carries a coaxial spur gear 15 which meshes with an intermediate spur gear 16 driving another spur gear 17, the latter being coaxially joined with a peripherally grooved coating roller 18.

The two end faces of the roller 18 have notches along the circumference similar to a milling cutter. For increasing the shearing action, the coating roller 18 is closely surrounded by a bracket 19 which forms a chute or cage. The running groove 20 for the wire 2 is cut deeply into the roller. The groove has a considerably smaller diameter than the notched lateral parts of the coating roller 18. By virtue of this design, the wire 2 emerges from the thixotropic dispersion virtually almost at the center axis of the roller 18. The relatively high lateral walls of the groove thus formed by the roller are so close to the wire 2 as to provide for sufficiently enveloping the wire with dispersion which, during this enveloping operation, is in liquid condition.

The viscosity of the thixotropic dispersion may also be reduced at the locality where the conductor emerges, by employing a rotating nozzle of generally tubular shape traversed by the conductor and having its inner surface profiled. As a result, the dispersion vigorously entrained by the travelling conductor into the interior of the nozzle is subjected to strong shearing tensions.

An example of such a cylindrical nozzle is shown in FIG. 5. A nozzle body 21 has an inner bore through which the wire passes out of the dispersion and toward the furnace. The cylindrical inner wall of the nozzle, facing the wire, is machined so as to have an internal screw thread of high pitch. By rotating the nozzle about its axis and controlling the rotating speed, the thickness of the covering applied to the wire can be adjusted.

In order to secure a substantially uniform covering on the electrical conductor to be insulated, it is advisable to maintain the level of the dispersion in the vessel substantially constant. This can be done by any conventional means, such as a float valve or valves. It is further preferable to employ coating rollers or coating nozzles, such as those shown at 18 or 21, of reinforced shaped plastics. Such plastics are preferable to metals because they are better wetted by the liquid, preferably aqueous dispersion, so that they convey a sufficient quantity of dispersion onto the conductor.

The method according to the invention for coating electrical conductors with thermoplastic synthetics is especially well suitable for polyethylene. However, the method is also applicable to other polyolefins, for example polypropylene, in the same manner. The invention is suitable for the processing of other readily meltable (fusible) thermoplastic synthetic materials.

We claim:
1. Method of insulating thin copper wires and other thin electric conductors with a coating of a polyolefin, which comprises passing the conductor through an aqueous dispersion of thixotropic structure, containing a solid content of 25 to 45% of said polyolefin having a pulverulent condition, mechanically reducing the viscosity of the thixotropic dispersion by means additional to said conductor movement at a locality where the conductor emerges from the dispersion, subsequently passing the dispersion-covered conductor through heated furnace zones and therein evaporating the dispersion medium and sintering the remaining pulverulent polyolefin on the conductor to form a homogeneous coherent coating.

2. Method of claim 1, wherein the polyolefin is polyethylene.

3. Method of claim 1, wherein the aqueous dispersion of thixotropic structure contains 0.2 to 5% of non-ionic surfacants.

4. Method of claim 1, wherein the aqueous dispersion of thixotropic structure contains 0.2 to 5% of ionic surfactants which are thermally dissociable to non-ionic products.

5. Method of claim 1, wherein the aqueous dispersion of thixotropic structure contains 1 to 20% of higher aliphatic alcohols.

6. Method of claim 1, wherein the aqueous dispersion of thixotropic structure contains cellulose hydrate, methylcellulose or soya lecithin as thickening agents.

References Cited
UNITED STATES PATENTS

| | | | |
|---|---|---|---|
| 2,645,626 | 7/1953 | Nordlander et al. | 117—232 |
| 2,686,770 | 8/1954 | Dipner | 117—232 |
| 2,865,795 | 12/1958 | Morrison. | |
| 2,919,213 | 12/1959 | Puppolo | 117—232 |
| 3,017,371 | 1/1962 | Hohenberg | 117—232 |
| 3,167,308 | 1/1965 | Bernstein et al. | |

FOREIGN PATENTS

| | | |
|---|---|---|
| 144,220 | 7/1949 | Australia. |
| 576,933 | 6/1959 | Canada. |

JOHN H. MACK, Primary Examiner

E. ZAGARELLA, Jr., Assistant Examiner

U.S. Cl. X.R.

117—128.4; 204—181